Patented Feb. 16, 1954

2,669,523

UNITED STATES PATENT OFFICE 2,669,523

COLD WATER DISPERSIBLE STARCH SIZES AND PROCESS OF MAKING THEM

Ralph W. Kerr, Riverside, and Walter J. Katzbeck, Oak Park, Ill., assignors to Corn Products Refining Company, New York, N. Y., a corporation of New Jersey No Drawing. Application August 28, 1952, Serial No. 306,965

14 Claims. (Cl. 106—213)

This invention relates to the production of modified starch products, and more particularly cold water dispersible starch products.

An object of this invention is to provide a process for the production of a dry starch product which is rapidly dispersible and highly soluble in cold water and the product thereof. A further object is the production of such products with a high rate of solution in cold water. Still a further object is the production of such products especially adapted for use as laundry starch. Another object is the production of such products which, when employed in sizing operations, exhibit acceptable stiffening value, uniformity in size coating, relative freedom from water spotting on a fabric when the latter is sized, dried, and sprinkled with water, and the ability to create a smooth, flexible finish when a fabric sized therewith is ironed.

Various methods have been employed in the past in efforts to obtain satisfactory cold water dispersible and cold water soluble starch products. One method involves passing moist starch filter cake between heated rolls and grinding the dried, gelatinized product to a powder. However, this material disperses in cold water only with great difficulty, and even with prolonged stirring only about 5 to 10 percent of the material actually dissolves. More recently starch has been partially hydrolyzed with acid, and the converted starch gelatinized and dried by passing an aqueous slurry between heated rolls. This product also disperses in cold water only with great difficulty and less than 25 percent of the material eventually dissolves.

Still more recently there has been obtained a starch suitable for use as a laundry size which disperses rapidly in cold water and rapidly dissolves therein to the extent of about 90 to 95 percent. This is accomplished by hydrolyzing the starch to a low viscosity level by means of an enzyme treatment, followed by completely gelatinizing and drying the converted starch on heated rolls. Such process is the subject of a copending patent application, U. S. Serial No. 28,416, filed May 21, 1948, Patent No. 2,609,326. This product, however, although a vast improvement over previous products, is likewise not completely satisfactory, inasmuch as if it is converted sufficiently to obtain practically instantaneous dispersibility and high solubility, it exhibits a tendency toward water spotting when fabrics are sized with it, then dried and sprinkled with water. When converted to a somewhat lesser degree, water spotting is not evident, but the rate of cold water dispersibility is adversely affected and the product contains an insoluble residue of such magnitude that the sizing obtained with it is uneven.

Thus, it is apparent that all cold water dispersible starch products heretofore produced lacked one or more of the several above-mentioned properties desirable in such a product.

It has now been discovered that an acceptable cold water dispersible starch product in dry form may be economically produced by treatment of the starch with an oxidizing agent, gelatinization, and dehydration of the gelatinized paste under controlled conditions.

Any native starch, such as corn, grain sorghum, wheat, etc., or mixtures thereof, may be employed in the process of this invention. However, corn starch is preferred for reasons of economy.

Likewise for economic reasons, sodium hypochlorite is the preferred oxidizing agent although other more costly reagents may be employed, such as per compounds, and especially soluble peroxides, particularly sodium, calcium and hydrogen peroxides; persulfates, perborates, chromates, and dichromates, usually employed in the form of their sodium salts; nitrogen dioxide; as well as sodium p-toluenesulfonechloramide, sold under the trade-mark "Chloramine-T"; etc. In addition to the economic advantage, sodium hypochlorite offers the added advantage that colorless products may be obtained more readily.

It is believed that the major action in the oxidation is the production of carboxyl groups from hydroxyl groups in the polysaccharide molecule. Consequently, the oxidizing action must be limited to a level below that at which extensive breakdown of the starch into low molecular weight bodies occurs, since the latter have little or no sizing value. The progress of the oxidation may be conveniently followed by viscosity measurements.

It has been found that oxidation of the starch to paste viscosities within the range of Scott test of about 45 seconds per 100 ml. using 100 grams of starch in 280 ml. of water to about 35 seconds per 100 ml. using 28.35 grams of starch in 280 ml. of water, leads to products which have optimal properties for a cold water dispersible starch product. When employing our preferred procedure, the preferred oxidation range is from about 80 to about 125 seconds using 100 grams of starch in 280 ml. of water.

For reasons of convenience, in that the required equipment is generally readily available in starch milling or processing plants, the starch is preferably treated with the oxidant in the granule stage as an aqueous suspension at temperatures below the gelatinization point of the starch. This method also possesses the added advantage that the oxidized starch may be readily purified from undesirable by-products which impair its colloidal properties by the simple expedient of filtration and washing with water. Oxidation in the granule stage offers a further advantage in that the oxidized starch may be readily dehydrated by conventional starch drying equipment, thereby permitting storage or transport to a distant location for subsequent stages of the process, if it should be desirable that the process be discontinuous. However, if desired, the oxidation may be performed on gelatinized starch, particularly in certain instances where by-products offer no problem, such as oxidation with hydrogen peroxide.

At some stage in the procedure the starch must be substantially completely dispersed and gelatinized. By complete gelatinization and dispersion, we means gelatinization accompanied by mechanical disruption of each starch granule so as to obtain a dispersion of substantially all of the starch molecules. The particular stage of the process, i. e. before, during, or after, oxidation at which this takes place is most critical. However, the starch should be as completely dispersed as possible when subjected to dehydration for production of the final product.

The means by which the substantially complete dispersion and gelatinization is accomplished are not critical. One satisfactory mode is by the use of higher temperatures and application of shearing stresses to the swollen starch granules, such as are obtained, for example, in homogenizing equipment. The preferred equipment for use in the present process is a "Votator," operated at temperatures in the region of about 90 to 95° C.

The "Votator" is functionally a heat exchange device of such design that it provides a high ratio of surface to volume, coupled with intense mixing or agitation, whereby viscous or paste type material may be quickly heated. Basically, the "Votator" consists of a jacketed heat transfer tube in which is provided a mechanically driven rotator of such dimension as to leave a relatively narrow annular space between the inside of the tube and the exterior of the rotator. The rotator is provided with a plurality of scraper blades and is adapted to be revolved at several hundred R. P. M. The heating medium is passed through the jacket on the heating tube countercurrent to the passage of the starch paste though the annular space therewithin. Only a small amount of the starch paste is in the "Votator" at any given time, and because of the high heat transfer surface coupled with the agitation and scraping effects provided by the scraping blades, the starch paste is brought up to the desired temperature in a relatively short period.

A number of United States patents have been issued which are directed to the "Votator" and various methods of using the same. Reference is made to United States Reissue Patent No. 22,519, reissued July 18, 1944, for a more detailed description of the construction and operation of the "Votator."

The "Votator," as used in our process, may be supplied with either water or steam as the heat transfer medium.

The use of the "Votator" enables continuous operation of the present process and the use of relatively concentrated starch liquor, thus increasing the output possible for a given volume capacity and minimizing the amount of water which must be evaporated during the dehydration step.

Although the "Votator" is particularly adapted for procuring the complete gelatinization required in this process, any other equipment or procedure which accomplishes complete dispersal of the starch substance may be employed in the gelatinization step. For example, a heated mixture of the starch and water may be pumped under pressure through the feed orifice of the spray drier.

When the gelatinization has been completed, the starch sol should be held under conditions optimal for maintaining the dispersed phase and least conductive to reassociation of the molecules until the starch is dehydrated. Higher temperatures and agitation are helpful in maintaining complete dispersion.

The starch sol is finally dehydrated. Our preferred equipment for the dehydrating procedure is a set of heated double rolls, although other forms of dehydrating equipment suitable for drying starch pastes, such as spray driers, may also be used.

It has been found that the mechanics of the dehydration process and the tendency to form a uniform and more readily redispersible product are materially benefited by incorporating from about 3 to about 7 percent boric acid into the starch sol being fed to the dehydrating equipment.

It has been further found that the starch may be very nearly completely gelatinized almost simultaneously with the dehydration by feeding a slurry of the starch to heated rollers, providing the starch has been oxidized to the upper limits indicated above, i. e. the paste viscosity of the starch by Scott test is of the order of about 45 to 55 seconds per 100 ml. for 100 grams of starch in 280 ml. of water. However, even at this level there is some sacrifice in stiffening power of the prepared starch and more tendency for the size to water-spot. Therefore, particularly at lower levels of oxidation, it is preferable for best results that the starch be gelatinized in a separate operation, as described above.

For maximum rate of redispersion, it is necessary to grind the dried product to a powder, unless it leaves the dehydrating apparatus in a pulverulent form, as for example, in spray drying. The preferred particle size is such that the powder will pass mesh sizes between 30 and 120 mesh.

The examples set forth below, which are intended as typical and informative only and not in a limiting sense, will further illustrate our invention. Tests used in characterizing the products obtained will be described hereinafter.

EXAMPLE 1

Corn starch was suspended in water at a density corresponding to 20° Bé. and treated at 25° C. by stirring with a solution of sodium hypochlorite which contained, based on weight of starch, 6 percent available chlorine and 1.5 percent free alkali. After approximately 15 hours, a sample of the starch after washing showed a paste viscosity by Scott test of 50 seconds per 100 ml. using 100 grams of starch in 280 ml. of water. The starch was then filtered and washed with water until it was substantially free of chlorides and approximately neutral in reaction.

The starch was then suspended in fresh water to make a slurry at approximately 20° Bé. and 5 percent boric acid was added, based on starch. This slurry was fed to rolls heated by steam at 90 p. s. i. on which the starch was gelatinized and dried. The resulting flake was ground to pass a 35 mesh copper sieve, and fines passing a 120 mesh sieve were rejected.

Dispersibility rating of this product in water at 25° C. was 10 seconds. Approximately 97 percent of the starch product dissolved. When fabric was immersed in the size, wrung and ironed, stiffening value, as determined by Flexometer readings, was 97 percent of that imparted by a 4 percent cooked paste of a conventional laundry starch (Linit brand laundry starch). Fabrics sized with the roll-dried product showed less masking, a more flexible and more natural feel and appearance then when sized with the cooked, conventional starch. Evenness of applied size, as evidenced by freedom from streak marks on dark goods, was substantially the same in both instances.

When the sized goods were sprinkled with water and dried, rating for water spotting imparted by the roll-dried product was 3 and for the conventional laundry starch 1.

EXAMPLE 2

Example 1 was repeated except that 3 percent boric acid was added to the starch fed to the rolls. Results obtained were similar to those obtained in Example 1, except that the dispersibility rating of the product of Example 2 was 20 seconds.

EXAMPLE 3

Example 1 was repeated except that 7 percent boric acid was added to the starch fed to the rolls. Results obtained were similar to those obtained in Example 1, except that the dispersibility rating of the product was slightly less than in Example 1, i. e. 20 seconds.

Apparently under these conditions, approximately 5 percent of boric acid is the optimal addition.

EXAMPLE 4

Example 1 was repeated using wheat starch. Results obtained were similar to those obtained in Example 1.

EXAMPLE 5

A blend of 60 parts by weight of wheat starch and 40 parts by weight of corn starch was oxidized, as in Example 1, except that approximately 6 percent available chlorine was used. The paste viscosity of the starch after oxidation was by Scott test 45 seconds per 100 ml. using 100 grams of starch in 280 ml. of water. Dispersibility rating of the final product was 15 seconds and the water spot rating was 3.

EXAMPLE 6

Example 1 was repeated with the exception that in the oxidizing step only approximately 4 percent available chlorine was used and the paste viscosity of the starch fiber oxidation was by Scott test 90 seconds per 100 ml. using 100 grams of starch in 280 ml. of water.

Dispersibility rating of this product in cold water was only fair, i. e., about 80 seconds, although substantially all of the starch eventually dissolved. The water spot rating was now only 2.

EXAMPLE 7

Example 1 was repeated except that in the oxidation step only 2 percent available chlorine was added and the starch had a paste viscosity by Scott test of 125 seconds per 100 ml. using 100 grams of starch in 280 ml. of water.

Dispersibility rating of this product in cold water was poor, i. e., 300 seconds, and the product generally unacceptable.

EXAMPLE 8

Corn starch was oxidized as in Example 1. After the starch was washed it was suspended in fresh water at a concentration of approximately 35 percent, 5 percent boric acid was added, based on starch, and the liquors were passed continuously through a "Votator" heated with steam so that the starch was heated to approximately 95° C. Thereafter the completely gelatinized paste was fed continuously through a pipe, maintained at 90–95° C., directly to the valley between two rolls heated with steam at 65 p. s. i. On these the starch sol was dehydrated to a flake. The flake was ground to pass a 35 mesh wire screen and fines passing a 120 mesh screen were rejected.

Again a product was obtained which has properties similar to those of the product of Example 1, including a water spot rating of 3.

EXAMPLE 9

Corn starch was treated, as in Example 8, except that the oxidation was limited to the level used in Example 6. (Scott test, 90 seconds per 100 ml. using 100 grams starch in 280 ml. of water.)

This product had a dispersibility rating in cold water of about 15 seconds, and approximately 97 percent dissolved to form a stable size. Sizing of fabrics with this preparation gave somewhat better results than freshly cooked conventional laundry starch used at an equal weight concentration. Although the sized goods had more body, the fabrics had a softer and more flexible feel and a more natural appearance. Water spot rating was 2.

EXAMPLE 10

Corn starch was treated, as in Example 8, except that oxidation was so limited (by the amount of oxidant) that the oxidized starch had a paste viscosity of 53 seconds per 100 ml. using 40 grams of starch per 280 ml. or 35 seconds per 100 ml. using 28.35 grams of starch.

This product had a dispersibility rating in cold water of 10 seconds, and approximately 92 percent dissolved. Fabrics sized with this preparation had very much more body than when sized with a freshly cooked conventional laundry starch at equal weight concentration and a more smooth, flexible and brilliant appearance. Moreover, the water spot rating of this starch was 0.

Comparing the results of Examples 1, 6 and 7 with the results of Examples 9 and 10, it is apparent that in order to make an acceptable cold water dispersible textile size by roll drying a slurry of oxidized starch, the starch should be oxidized at least to the viscosity level indicated in Example 6; if lesser degrees of oxidation are employed, such as used in Example 9, an acceptacle product may be made if gelatinization is performed in a separate operation, as by use of a "Votator."

Analytical methods employed in testing the product produced according to this invention are as follows:

Cold water dispersibility measurements are made as follows:

A specially constructed funnel, either of glass or metal, capable of holding 500 ml. of aqueous liquid and to which is attached a screen 1.75 sq. cm. in area and having 70 meshes to the inch is required in this determination.

Twenty grams of the starch to be tested are weighed on a torsion balance and added to 400 ml. of water at a temperature of 77° F. (25° C.) in a liter beaker. The dispersion is agitated with a four finger breaker-type agitator revolving at 280 R. P. M. The starch product is dispersed for exactly 45 seconds.

At the end of the time interval, the dispersion is rapidly transferred to the funnel described, which is supported over a 500 ml. graduate. The time required for a given volume of dispersion to pass through the funnel is considered the dispersibility rating. The less time required to collect a definite volume of filtrate the better is the rating of the product.

By this procedure ratings are as follows:

Excellent=15 seconds or less for 400 ml.
Good=15-60 seconds for 400 ml.
Fair=60-120 seconds for 400 ml.
Poor=More than 120 seconds for 400 ml.

Cold water solubility determinations are made as follows:

Weigh accurately a 2 gram sample of the starch to be tested and transfer it carefully to a dry 200 ml. centrifuge bottle. Add exactly 99 ml. of distilled water and shake vigorously as soon as the water comes into contact with the starch. Stopper the bottle and shake mechanically for 15 minutes. Centrifuge the bottle containing the sample for 15 minutes at approximately 2000 R. P. M. Pipet accurately a 25 ml. aliquot of the supernatant solution into a dry, tared nickel or silica dish. Evaporate the sample to dryness on a steam bath or in an air oven at 100° C. Complete drying by placing the sample in a vacuum oven at 105° C. for 4 hours. Remove sample from oven, cool in desiccator and weigh.

Calculation:

$$\% \text{ Soluble (d. b.)} = \frac{\text{Residue Weight} \times 400}{\text{Sample Weight (2 g.)} \times \text{d. s.}}$$

Flexometer sizing value determinations are made as follows:

*Materials and equipment*

(1) Schiefer Flexometer and accessories [1]
(2) Electric mangle
(3) Mechanical wringer
(4) Storage space at constant temperature and humidity
(5) Loosely woven cotton fabric such as muslin, longcloth or cambric (approximately 0.010 inch thick and of a thread count of approximately 50/50)
(6) Pabst "Ex-Size" for desizing the material
(7) Reference Standard (Commercial laundry starch prepared in crystal form by drying 60-fluidity, acid-modified corn starch)

*Preparation of material.*—Desize the material by soaking overnight in a solution containing 10 ml. of Pabst "Ex-Size" per liter of solution. Wash the desized material through 2 sets of soapsuds and rinse with water 5 times, using distilled water for the last rinse. If the desired sample is dry, immerse in distilled water and put through the wringer just before sizing. The cloth should be torn into test strips 36 inches long and 6 inches wide before sizing.

*Preparation of sizing solutions: Reference standard.*—Weigh 20 grams of reference standard starch into a 1 liter beaker and add 450 ml. of distilled water.[2] Stir the mixture until the starch is suspended and place the suspension over a Bunsen or Fischer burner. Stir continually until the starch is gelatinized and bring the solution to a boil. Boil for 4 minutes. Cool the solution to room temperature (70-78° F.) and adjust the net weight to 500 grams. Stir the solution and cover until ready to use.

*Cold water dispersible, cold water soluble starch sample.*—Weigh 20 grams of the starch to be tested into a 1 liter beaker. Add 480 ml. of distilled water at room temperature (70-78° F.) and stir vigorously as the water comes in contact with the starch. Mix 3 minutes with a mechanical stirrer (propeller type) and inspect the solution for undissolved particles. If necessary, mix until no undissolved lumps remain. Cover the solution until ready for use.

*Sizing the fabrics.*—The cotton fabrics (6" x 36") which have been previously dipped in distilled water are put through the wringer. If not used immediately, they are kept in a covered beaker. Immerse the test samples in the starch solution and stir for 1 minute. Allow the sample to remain in the starch solution for 2 additional minutes. Adjust the pressure on the rolls of the wringer and do not change this pressure setting while running a series of samples. Wipe the wringer rolls with a desized towel wrung from distilled water after each starched sample is wrung through. Now put the sample through the wringer and place in a covered beaker until ready for ironing.

Heat the electric mangle until the temperature reaches 450° F. Put a desized cloth over the mangle roll and leave in position. Now iron the sample until it is dry; 2 or 3 revolutions are usually sufficient. Each sample must be ironed on a freshly desized cover over the mangle roll. The ironed samples are then conditioned at least 12 hours in the constant temperature room (73° F. and 50 percent relative humidity).

The sample is then cut into strips 2 inches by 6 inches, which are tested with a Flexometer.

*Measurement and calculations.*—A test strip is placed on the mounting block and clamped in position. The mounting clamps are then affixed with Canada balsam. The specimen is removed from the block and the excess material is cut off, leaving the sample 2 inches by 4 inches. Sixteen such specimens are prepared from each sample. The specimens are mounted on the Flexometer and the spring deflection is determined as outlined below. The average result obtained on 8 such pairs of samples is the spring deflection for the sample.

After the samples are mounted on the Flexometer, the movable plate is rotated to lower scale reading of 10. The upper scale reading is noted

---

[1] "The Flexometer, an Instrument for Evaluating the Flexural Properties of Cloth and Similar Materials," by H. F. Schiefer, Research Paper No. 555, Bureau of Standards Journal of Research, vol. 10, pages 647-57 (1933).

[2] If it is desired to test solutions on a dry substance basis rather than a commercial basis, weigh out a sample equivalent to 20 g. of dry solids and add sufficient distilled water to make a total weight of 500 g. This technique is recommended when the samples are subject to large variations in moisture.

and recorded. The upper scale reading minus the lower scale reading is the instrument blank. Now the movable plate is rotated to lower scale reading of 72 over a period of 10 seconds. The movable plate is held at this reading until 30 seconds have elapsed and then the upper scale reading is noted and recorded, while the lower scale is held at a reading of 72. The difference between the upper scale reading and the 72 minus the instrument blank is called the spring deflection at a folding angle of 8 degrees. The deflections for reference standard starch and cold water dispersible, cold water soluble starch are then compared and the stiffness of cold water dispersible, cold water soluble starch is expressed in terms of the reference standard.

$$\text{Percent stiffness (Relative to reference standard)} = \frac{\text{Cold water dispersible, cold water soluble starch spring deflection} \times 100}{\text{Reference standard spring deflection}}$$

*Sample Calculation*

| Reference Standard | | Cold Water Dispersible, Cold Water Soluble Starch | |
|---|---|---|---|
| Lower Scale | Upper Scale | Lower Scale | Upper Scale |
| 10 | 12.2 | 10 | 12.2 |
| 72 | 86.2 | 72 | 87.4 |

Reference standard spring deflection = 12.0
Cold water dispersible, cold water soluble starch spring deflection = 13.2

$$\text{Percent stiffness (Relative to reference standard)} = \frac{13.2 \times 100}{12} = 110 \text{ percent}$$

The satisfactory range for percent stiffness of cold water dispersible, cold water soluble laundry starch is 90–110.

Scott test for starch paste viscosity is described in Chemistry and Industry of Starch by R. W. Kerr, 2nd edition, pp. 119–121.

Water spotting is determined on light colored goods which have been sized with various starches at approximately 5 percent concentration and ironed, by placing 5 drops of water in one spot on the surface of the fabric and noting the intensity of the ring mark which develops on evaporation of the spot of water. On an arbitrary scale, native corn starch has a rating of zero, conventional laundry starches (such as Linit brand laundry starch) a rating of one and cold water dispersible laundry starches of the prior art (such as produced according to copending application U. S. Serial No. 28,416, filed May 21, 1948, Patent No. 2,609,326) a rating of 3 to 4.

We claim:

1. Process for the production of a cold water dispersible, cold water soluble textile size comprising treating starch with an oxidizing agent, substantially completely gelatinizing and molecularly dispersing the starch, and hydrating the starch paste; said dehydration being accomplished in the presence of from about 3 to about 7 per cent of boric acid, based on the weight of the starch, said boric acid being added to the starch after oxidation but prior to dehydration; the treatment with said oxidizing agent being carried on until a sample exhibits a paste viscosity by Scott test within the range of about 125 seconds per 100 ml. using 100 grams of starch in 280 ml. of water to about 35 seconds per 100 ml. using 28.35 grams of starch in 280 ml. of water.

2. Process for the production of a cold water dispersible, cold water soluble textile size, comprising treating an aqueous slurry of starch with an oxidizing agent at a temperature below the gelatinization point until a sample of said starch exhibits a paste viscosity by Scott test within the range of about 125 seconds per 100 ml. using 100 grams of starch in 280 ml. of water to about 35 seconds per 100 ml. using 28.35 grams of starch in 280 ml. of water, filtering and washing the oxidized starch and adding thereto boric acid and then passing the starch over heated rolls to gelatinize and dehydrate the same; the amount of boric acid being about 3 per cent to about 7 per cent, based on the weight of the starch.

3. Process according to claim 2 wherein said oxidizing agent is sodium hypochlorite and said starch is corn starch.

4. Process according to claim 1, wherein said oxidizing agent is sodium hypochlorite.

5. Process according to claim 1, wherein said oxidizing agent is a soluble salt of a per compound.

6. Process according to claim 5, wherein said per compound is a soluble peroxide.

7. Process according to claim 1, wherein said oxidizing agent is nitrogen dioxide.

8. Process according to claim 1, wherein said oxidizing agent is sodium p-toluensulfonechloramide.

9. Process according to claim 1, wherein said dehydration is carried out by spray drying.

10. Process according to claim 1, wherein said starch is corn starch.

11. Process according to claim 1, wherein said starch is wheat starch.

12. Process according to claim 1, wherein said starch is grain sorghum starch.

13. Cold water dispersible, cold water soluble starch, produced according to the process of claim 1.

14. Cold water dispersible, cold water soluble starch produced by treating starch with an oxidizing agent until a sample exhibits a paste viscosity by Scott test within the range of about 45 seconds per 100 ml. using 100 grams of starch in 280 ml. of water to about 35 seconds per 100 ml. using 28.35 grams of starch in 280 ml. of water, substantially completely gelatinizing and molecularly dispersing the starch, and dehydrating the starch paste in the presence of from about 3 to about 7 percent of boric acid, based on the weight of the starch said boric acid being added to the starch after oxidation but prior to dehydration, and being dispersed in cold water within at least about 80 seconds and having a water spot rating not exceeding about 3.

RALPH W. KERR.
WALTER J. KATZBECK.

References Cited in the file of this patent

UNITED STATES PATENTS

| Number | Name | Date |
|---|---|---|
| 1,020,655 | Perkins | Mar. 19, 1912 |
| 2,424,050 | Pecker et al. | July 15, 1947 |
| 2,541,773 | Lokema et al. | Feb. 13, 1951 |
| 2,559,043 | Nestor | July 3, 1951 |

FOREIGN PATENTS

| Number | Country | Date |
|---|---|---|
| 179,765 | Great Britain | May 18, 1922 |
| 188,992 | Great Britain | Nov. 23, 1922 |
| 412,377 | France | July 11, 1910 |